United States Patent [19]
Thomas

[11] Patent Number: 5,857,716
[45] Date of Patent: Jan. 12, 1999

[54] CORRUGATED FLEXIBLE HOSE COUPLING SYSTEM

[75] Inventor: R. Winfield Thomas, West Lebanon, Ind.

[73] Assignee: Tru-Flex Metal Hose Corporation, W. Lebanon, Ind.

[21] Appl. No.: 797,564

[22] Filed: Feb. 7, 1997

[51] Int. Cl.⁶ ....................................... F16L 3/04
[52] U.S. Cl. ...................... 285/143.1; 285/348; 285/351; 285/354; 285/903
[58] Field of Search .................... 265/903, 354, 265/348, 143.1, 39, 351; 411/39, 40

[56] References Cited

U.S. PATENT DOCUMENTS

| | | | |
|---|---|---|---|
| 406,561 | 7/1889 | Buchanan | 285/348 X |
| 657,712 | 9/1900 | Thomas | 285/348 X |
| 1,597,525 | 8/1926 | Knake | 411/540 |
| 2,318,575 | 5/1943 | Armington et al. | 285/348 X |
| 2,503,169 | 4/1950 | Phillips | 285/903 X |
| 3,008,738 | 11/1961 | Longfellow | 285/354 X |
| 3,858,421 | 1/1975 | Wood . | |
| 4,068,863 | 1/1978 | Lasko | 285/39 |
| 4,084,309 | 4/1978 | Wood . | |
| 4,423,891 | 1/1984 | Menges | 285/903 X |
| 4,437,691 | 3/1984 | Laney | 285/903 X |
| 4,629,226 | 12/1986 | Cassel et al. . | |
| 4,674,775 | 6/1987 | Tajima et al. | 285/903 X |
| 4,801,156 | 1/1989 | Gomi | 285/903 X |
| 4,974,879 | 12/1990 | Berch et al. | 285/143.1 |
| 5,080,405 | 1/1992 | Sasa et al. | 285/903 X |
| 5,128,112 | 7/1992 | Wood . | |
| 5,199,747 | 4/1993 | Jehr . | |
| 5,222,288 | 6/1993 | Thomas . | |
| 5,228,479 | 7/1993 | Guginsky . | |
| 5,362,113 | 11/1994 | Thomas . | |
| 5,441,312 | 8/1995 | Fujiyoshi et al. | 285/903 X |
| 5,494,319 | 2/1996 | Thomas . | |
| 5,538,294 | 7/1996 | Thomas . | |

FOREIGN PATENT DOCUMENTS

| | | | |
|---|---|---|---|
| 54541 | 6/1993 | European Pat. Off. | 285/903 |
| 2653202 | 4/1991 | France | 285/903 |
| 6011084 | 1/1994 | Japan | 285/903 |

*Primary Examiner*—Dave W. Arola
*Attorney, Agent, or Firm*—Litman, McMahon & Brown, L.L.C.

[57] ABSTRACT

A coupling system for corrugated, flexible metal hoses includes fitting and washer assemblies. The fitting assembly comprises inner and outer fittings, the inner fitting being received on the hose and having a bore adapted to receive the washer assembly. The washer assembly includes an O-ring, a backer washer and an expandable washer. The O-ring forms a seal connection with the flexible metal hose and the fitting assembly. The expandable washer provides a stop against which the backer ring is pushed by the O-ring. The expandable washer is also clamped between the fitting assembly and a corrugation of the flexible hose to resist withdrawal of the latter. Modified embodiment hose coupling systems are also disclosed and include inner and outer gaskets, compression gaskets, termination plates mounting the outer fitting and different combinations of retainer rings, backer rings and gasket rings. An application of the coupling systems includes a fuel source, a fuel line, a manifold, the coupling system, a corrugated flexible hose and a gas-fired appliance.

6 Claims, 15 Drawing Sheets

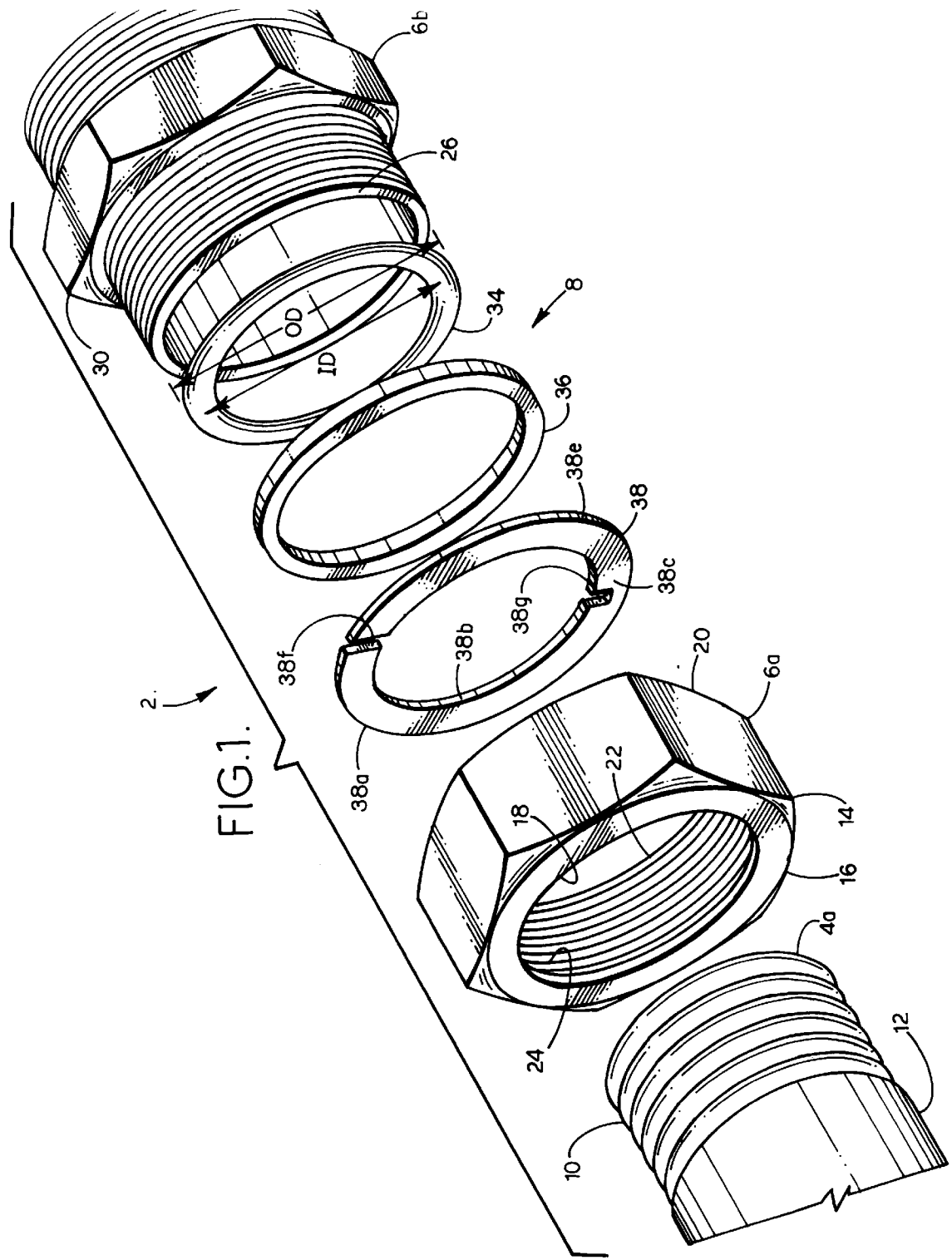

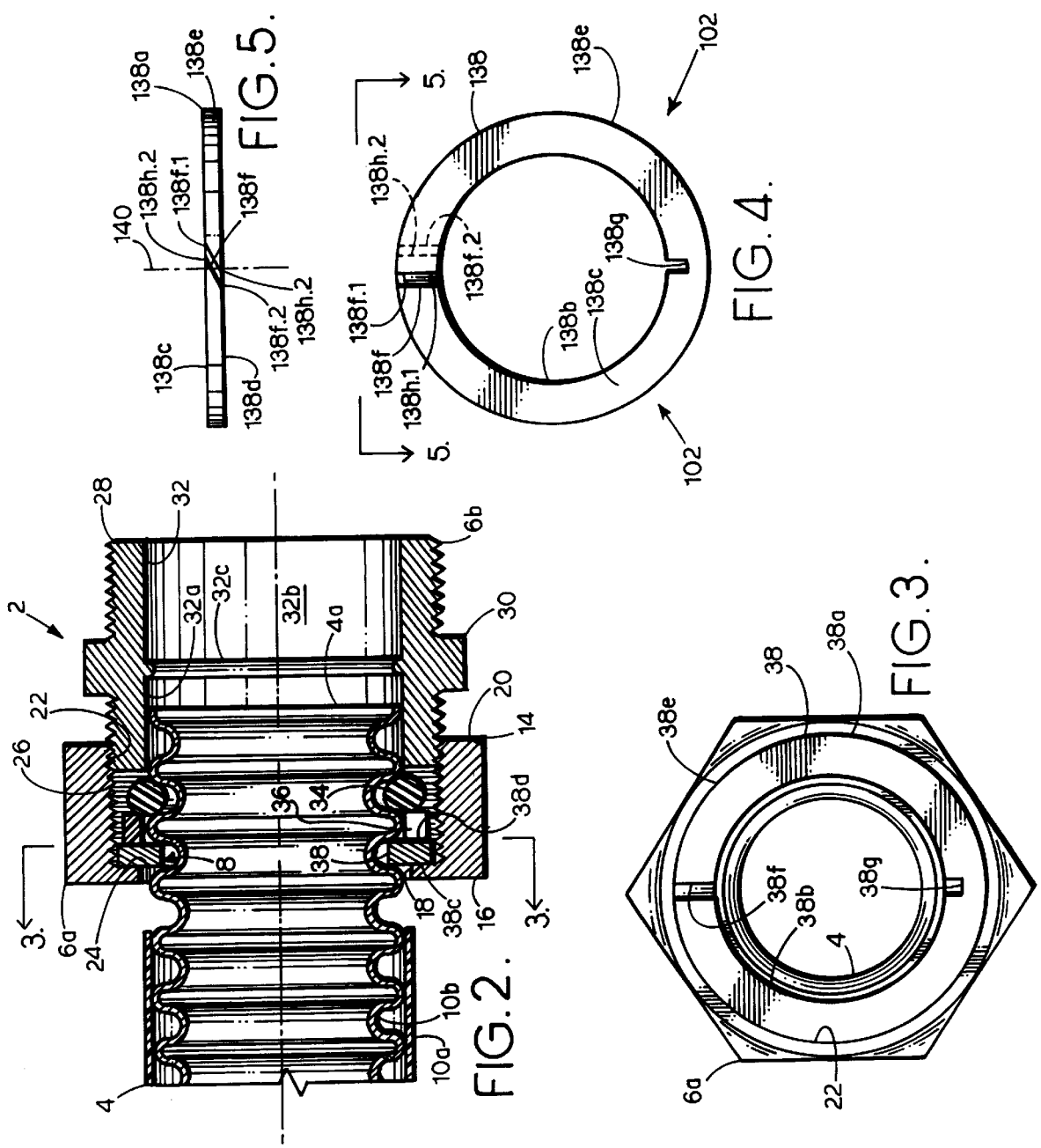

CORRUGATED FLEXIBLE HOSE COUPLING SYSTEM

CROSS-REFERENCE TO RELATED APPLICATION

The present application is a continuation-in-part patent application based on U.S. patent application Ser. No. 08/712,627, filed Sep. 11, 1996, and entitled CORRUGATED FLEXIBLE HOSE COUPLING SYSTEM.

BACKGROUND OF THE INVENTION

1. Field of the Invention

The present invention relates generally to hose couplings, and in particular to a coupling system for a corrugated, flexible metal hose.

2. Description of the Related Art

Hoses, conduits, pipes and the like are commonly used to convey a wide variety of different fluids. Many such applications require flexible metal hose to accommodate relative movement between system components being connected. For example, fuel lines intended to convey gaseous fuels (e.g. natural gas or propane), are commonly constructed of flexible metal hose.

To accommodate relative movement in gaseous fuel systems, the fuel lines are often flexible. For example, flexible corrugated metal hose is commonly used for connecting a wide variety of gas-fired appliances to gas sources. Such corrugated metal hose has several advantages, including flexibility and an ability to extend and contract. Moreover, it is relatively inexpensive to manufacture and its use tends to reduce the need to precisely position a gas-fired appliance with respect to a gaseous fuel source. Therefore, installation of gas-fired appliances can be facilitated because exact placement is not necessary and approximate positioning can be accommodated by a flexible gas line. Gas lines can be permanently installed in a building and routed through the structure from a gas source to the general location of gas-fired equipment and appliances. Less-permanent gas lines are often used for making the final connections to the appliances themselves, and are commonly referred to as "whips". Gas line whips are commonly fabricated from lengths of corrugated, flexible metal hose. Both permanent gas lines and whip gas lines require secure end connections. Whip gas lines are commonly used with appliances which are subject to some degree of movement, such as gas-fired dryers, ovens and the like.

Design criteria common to such gas lines include providing relatively secure, fluid-tight seals and providing sufficiently strong end connections to avoid a separation or pull-out of the line from the appliance or other equipment. In the case of a gaseous fuel line, leaks can be very dangerous since many gas fuels are by nature both toxic and highly flammable. Thus, to avoid accidental gas poisoning or explosion, structurally secure systems are very important.

In the case of rigid gas lines, sufficient material thickness is often present to provide threaded fittings, which tend to be relatively secure and leak-resistant. With corrugated flexible metal hose, however, the material is often relatively thin-walled and thus not sufficiently thick to accommodate threading.

To address the problem of providing secure fittings on flexible metal hose, various coupling systems have been devised. These include a variety of compression fittings, washers, O-rings and gaskets. However, heretofore there has not been available a coupling system for a corrugated flexible hose with the advantages and features of the present invention.

SUMMARY OF THE INVENTION

In the practice of the present invention, a coupling system is provided for coupling a flexible metal hose with annular or spiral corrugations to a device, such as a gas-fired appliance or a fuel source. The hose coupling system includes a fitting assembly with inner and outer fittings adapted for threaded inter-connection on the end of the flexible hose. The inner fitting includes a bore which receives a washer assembly with an O-ring for forming a sealing connection, a backer ring and an expandable washer. The expandable washer is selectively receivable on the corrugations of the flexible hose and functions to retain the fitting and washer assemblies securely in place and to prevent pull-out of the coupling while providing a positive connection to the hose whereby the O-ring gasket can be compressed for an effective seal.

OBJECTS AND ADVANTAGES OF THE INVENTION

The principal objects and advantages of the present invention include providing a coupling system for flexible hoses; providing such a coupling system which is easily mounted on various corrugated flexible metal hoses; providing such a coupling system which provides a relatively secure connection; providing such a coupling system which effectively resists pull-out; providing such a coupling system which facilitates relatively quick installation; providing such a coupling system which facilitates the installation of gas-fired appliances; providing such a coupling system which at least partly utilizes commonly available components; providing such a coupling system which is adaptable for providing coupling connections to various gas-fired appliances; providing such a coupling system which facilitates position adjustments in gas-fired appliance installations; providing such a coupling system which provides positive engagement for an expandable washer with corrugations of a flexible metal hose; providing such a coupling system which is economical to manufacture, simple to install, capable of a long operating life and particularly well-adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an exploded, perspective view of a corrugated hose coupling system embodying the present invention.

FIG. 2 is an enlarged, longitudinal cross-section of the coupling system.

FIG. 3 is a transverse, cross-sectional view of the coupling system taken generally along line 3—3 in FIG. 2.

FIG. 4 is a plan view of a retaining washer of a corrugated hose coupling system comprising a first modified embodiment of the present invention.

FIG. 5 is a side elevational view of the retaining washer of the first modified embodiment.

DETAILED DESCRIPTION OF THE INVENTION

I. Introduction and Environment

Figure 6:
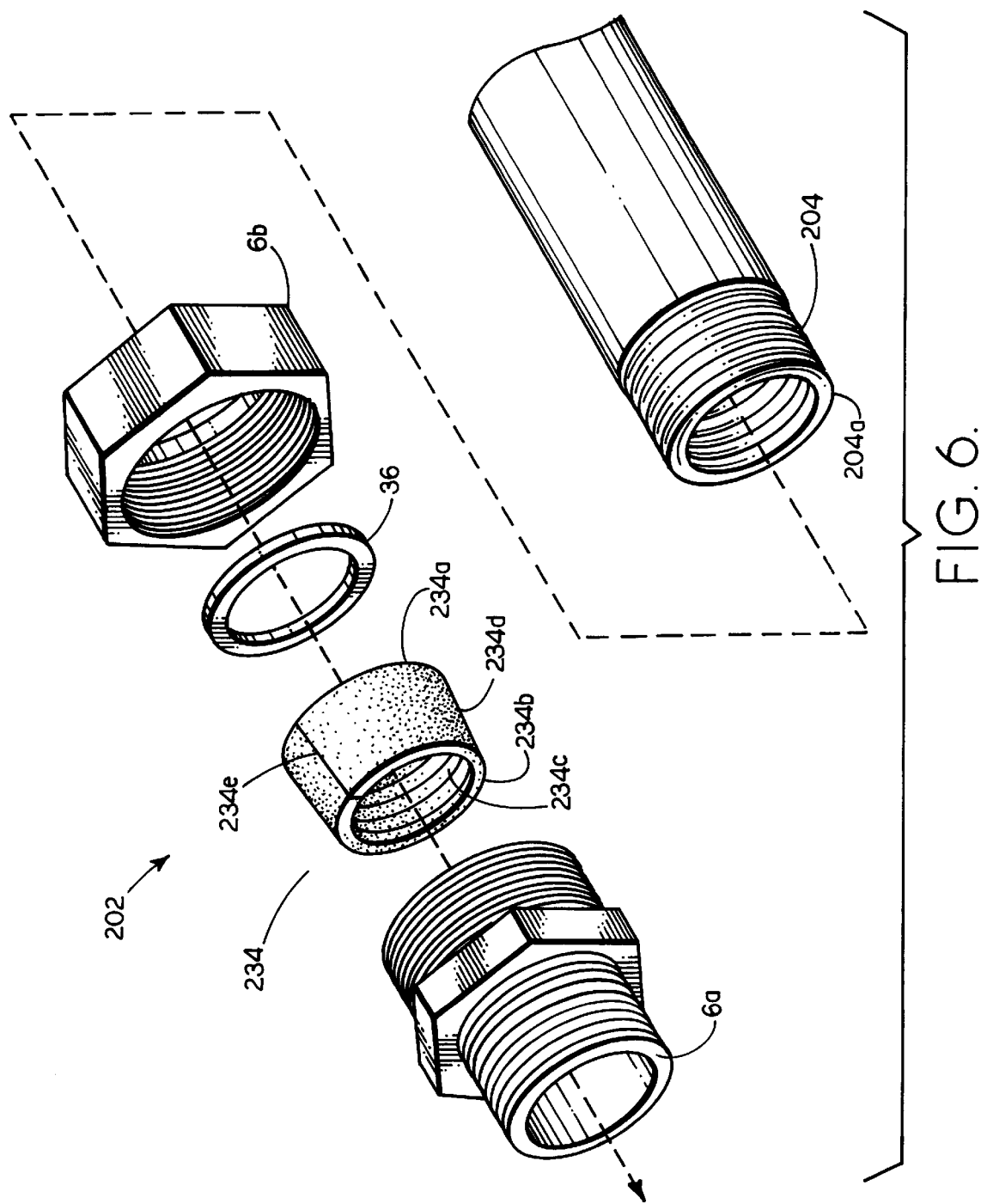
FIG. 6 is an exploded, perspective view of a corrugated hose coupling system comprising a second modified embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a hose coupling system embodying the present invention and adapted for connecting a flexible hose 4 and generally comprising a fitting assembly 6 and a washer assembly 8.

The flexible hose 4 includes corrugations 10 with alternating lands and grooves 10a, 10b and can include an identifying (e.g., color-coded yellow for gas) covering 12. Without limitation on the generality of hoses which can be coupled with the coupling system 2, the flexible hose 4 can primarily comprise metal with the identifying covering 12 comprising plastic.

The hose coupling system 2 can be utilized to connect the flexible hose 4 to, for example, appliances, equipment, natural gas or propane supply sources, fuel tanks and other hoses. See, for example, FIG. 16.

II. Fitting Assembly 6

The fitting assembly 6 includes inner and outer fittings 6a, 6b. The inner fitting 6a can comprise a slip nut with a generally hexagonal body 14 having an inner end 16 with a receiver 18 slidably receiving the flexible hose 4 and an outer end 20. A female-threaded bore 22 is open at the outer end 20. The bore 22 terminates at a shoulder 24 surrounding the receiver 18 in proximity to the inner end 16.

The outer fitting 6b includes a male-threaded inner end 26 threadably engageable with the female-threaded bore 22 of the inner fitting 6a and a male-threaded outer end 28. A medial hexagonal nut 30 is positioned between the inner and outer ends 26, 28. A bore 32 extends between the inner and outer ends 26, 28 and comprises inner and outer bore sections 32a, 32b with a bore shoulder 32c located therebetween. Although the fitting assembly 6 is shown and described with a particular combination of male and female threaded components, other configurations of fittings could be utilized with the hose coupling system 2 of the present invention. For example, the outer fitting 6b could have a female-threaded outer end.

III. Washer Assembly 8

The washer assembly 8 includes: a rubber or elastomeric O-ring 34; backer ring 36 comprising plastic, metal, high-temperature ceramic or some other suitable materials and an expandable washer 38. The O-ring 34 has an outside diameter (OD) which can be sized to fit within the inner fitting bore 22 and an inside diameter (ID) generally corresponding to the diameter of the hose 4 at a respective corrugation groove 10b. The O-ring 34 is preferably sized to fit closely within a respective hose corrugation groove 10b.

The plastic backer ring 36 also has an OD adapted to fit within the threaded bore 22 and has an ID which is slightly greater than the diameter of the hose lands 10a whereby the backer ring 36 is adapted to slidably receive the hose 4.

The washer assembly 8 further includes an expandable washer 38 comprising a generally annular body 38a forming a receiver 38b and having first and second faces 38c,d. The washer body 38a forms a perimeter 38e. A slot 38f extends between and is open at the washer receiver 38b and the washer perimeter 38e. A notch 38g is formed in the washer body 38a generally opposite the slot 38f and is open to the receiver 38b thereof. The expandable washer 38 has an inside diameter defined by the receiver 38b which is greater than a diameter of the hose 4 at a groove 10b thereof and less than the hose diameter at a land 10a thereof. The expandable washer 38 is thus retained in place on the flexible hose 4 by the corrugations 10.

IV. Operation

In operation, the hose coupling system 2 is assembled as shown in FIG. 2 and functions to effect a relatively secure connection between the flexible hose 4 and the fitting assembly 6 whereby a relatively secure and fluid-tight seal is formed therebetween. More specifically, the expandable washer 38 is engaged on one face 38c thereof with the inner fitting inner end 16 and with a respective corrugation land 10a. A connection is formed with the hose coupling system 2 by first inserting the end of the flexible hose 4 through the inner fitting receiver 18 whereby the inner fitting 6a is positioned on the flexible hose 4 with its threaded bore 22 open outwardly. Next the expandable washer 38 is installed by expanding its receiver 38b to receive the flexible hose 4. Expansion of the expandable washer 38 is facilitated by the cooperation of the slot 38f with the notch 38g located diametrically opposite therefrom, which permits sufficient expansion to receive the flexible hose 4. The expandable washer 38 can then snap or be bent into place in a respective groove 10b.

When properly positioned, the expandable washer 38 snaps into place at least partly in a respective corrugation groove 10b, preferably at least 2 grooves 10b back from an end 4a of the flexible hose 4. The backer ring 36 can then be placed over the flexible hose 4 into engagement with the expandable washer second face 38d. The O-ring 34 is stretched over the flexible hose end 4a and snaps into place in, for example, the next corrugation groove 10b out from the groove 10b receiving the expandable washer 38.

The inner fitting 6a is then brought into engagement with the expandable washer 38 and threadably receives the inner, male-threaded end 26 of the outer fitting 6b, the inner end 26 of which engages the O-ring 34 and expands same through a clamping action. The O-ring 34 is thus expanded into sealing engagement with corrugation lands 10b on both sides of a respective corrugation groove 10a. The backer ring 36 tends to be drawn outwardly and into engagement with the O-ring 34 by the action of threadably screwing the outer fitting 6b into the inner fitting 6a, thus facilitating expansion of the O-ring 34 into its sealing engagement. The thickness of the backer ring 36 is preferably sized to space the expandable washer 38 and the O-ring 34 apart approximately the spacing of an adjacent pair of flexible hose grooves 10b.

The expandable washer 38 resists pulling out of the flexible hose 4 from the coupling system 2 by abutting a respective corrugation land 10a. With the expandable washer 38 captured within the inner fitting bore 22, it is prevented from expanding and thus securely retained within a respective corrugation groove 10b. The hose coupling system 2 thus offers substantial resistance to being pulled apart, even if significant force is exerted on the flexible hose 4.

V. First Modified Embodiment Hose Coupling System 102

A corrugated hose coupling system comprising a first modified embodiment of the present invention is shown in FIGS. 4 and 5 and is generally designated by the reference numeral 102. The coupling system 102 includes a modified expandable washer 138 which includes a generally annular body 138a with a concentric, generally circular receiver 138b, a first face 138c, a second face 138d and a perimeter 138e. A slot 138f is formed in the body 138a and extends radially from the receiver 138b to the perimeter 138e. The slot 138f is open at first and second slot mouths 138f.1, 138f.2 formed at the washer first and second faces 138c, 138d respectively. The slot mouths 138f.1, 138f.2 are staggered and are positioned in circumferentially-spaced relation on the body 138a whereby angled first and second body ends 138h.1, 138h.2 overly each other with slot 138f extending at a slant forming an acute angle with respect to a longitudinal axis 140 of the coupling system 102.

A notch 138g is formed in the body 138a and extends partway therethrough from the receiver 138d to facilitate spreading the expandable washer 138. The angled, slanted orientation of the slot 138f facilitates maintaining a fluid-tight seal with the O-ring 34. Thus, slight expansions and retractions of the washer 138 will not interfere with its continuity since the slot 138f accommodates slight movements of the body ends 138h.1, 138h.2 with respect to each other. The continuity of the washer 138 facilitates engagement by the O-ring 134.

VI. Second Modified Embodiment Hose Coupling System 202

Figure 7:
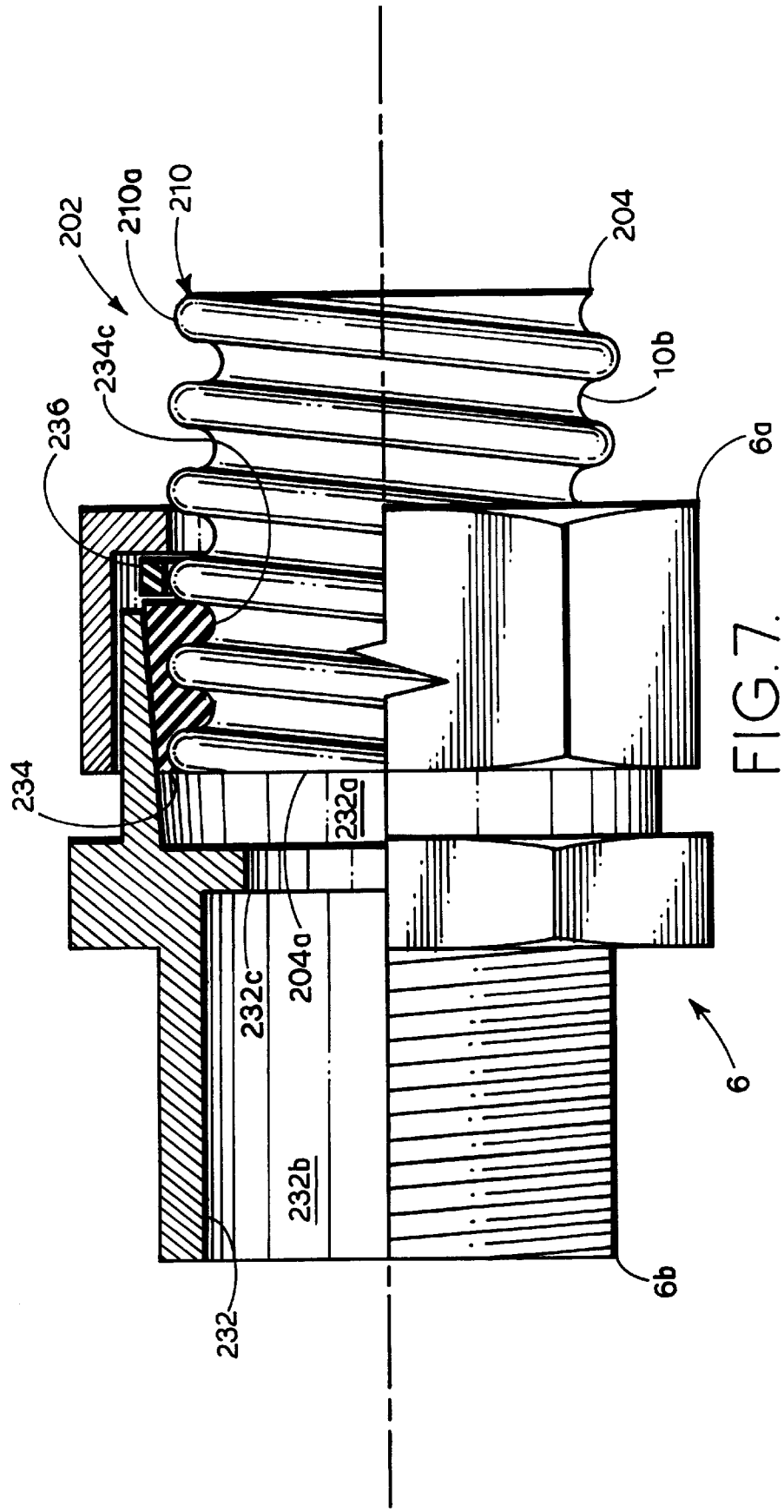
FIG. 7 is an enlarged, longitudinal cross-section of the second modified embodiment corrugated hose coupling system.
Figure 8:
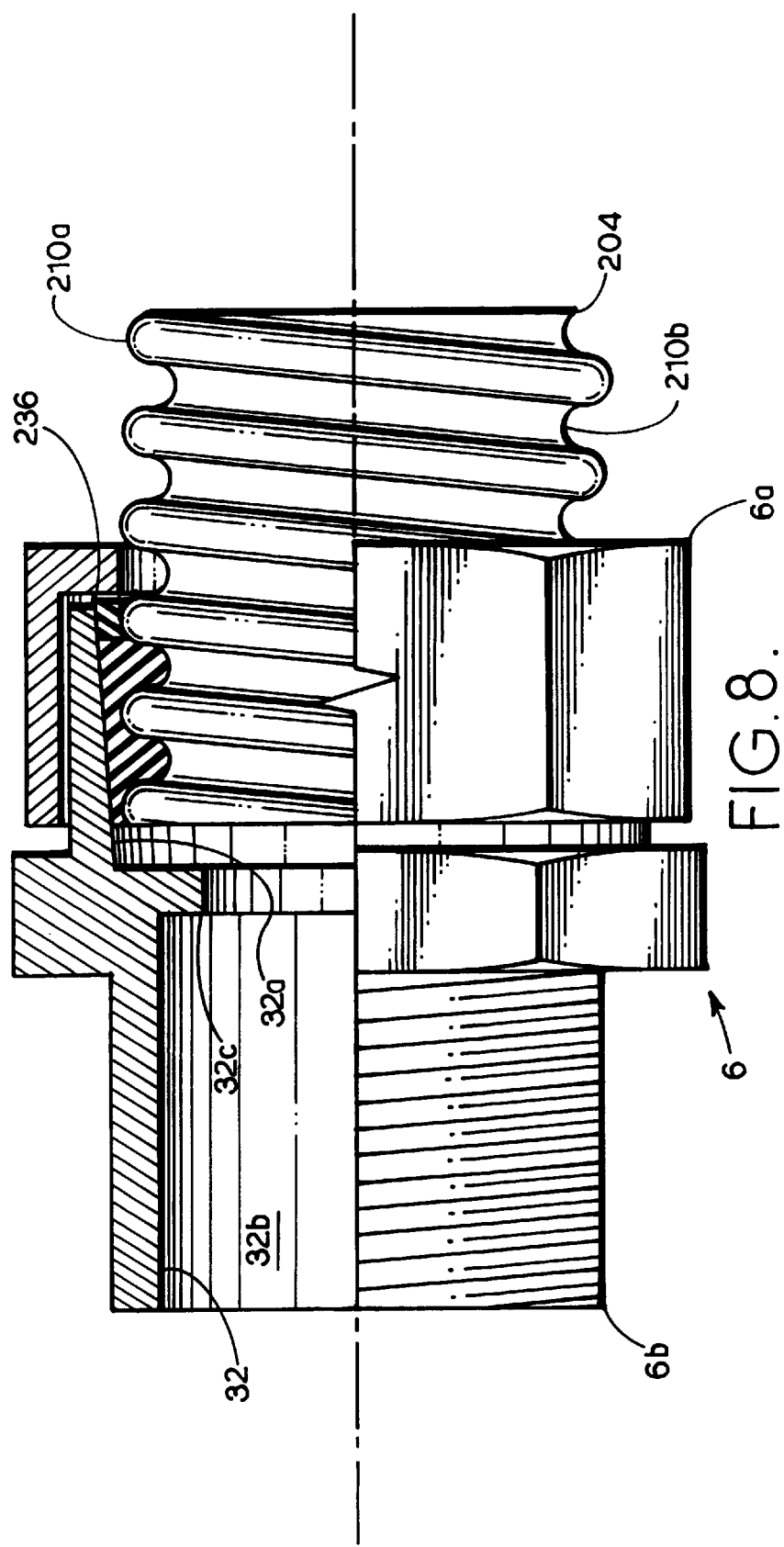
FIG. 8 is an enlarged, longitudinal cross-section of the second modified embodiment corrugated hose coupling system.

A hose coupling system 202 comprising a second modified embodiment of the present invention is shown in FIGS. 6, 7 and 8. The hose coupling system 202 is adapted for mounting on a flexible hose 204 with an end 204a and spiral-wound corrugations 210 with alternating lands and grooves 210a,b. The hose connection system 204 includes a gasket 234 which threadably mounts on the flexible hose end 204a. The gasket 234 includes first and second ends 234a,b, a female-threaded bore 234c extending therebetween and open thereat and a generally frusto-conical outer surface 234d with a configuration generally corresponding to the outer fitting bore inner section 232a. The gasket outer surface 234d could be configured to accommodate various fittings, and could be, for example, generally cylindrical. The gasket 234 can include a longitudinal slit 234e which facilitates snapping it on the flexible hose end 204a. Alternatively, the gasket 234 can be threaded onto the flexible hose end 204a.

In operation, the gasket 234 functions to form a fluid-tight seal with the outer fitting assembly 6b and the flexible metal hose 4. The shoulder 32c of the outer fitting 6b engages the gasket first end 234a and expands same against the outer fitting inner end 26. The female-threaded gasket bore 234c cooperates with the flexible hose corrugations 210 to provide substantially continuous sealing in the hose connection system 202. Moreover, threaded engagement between the flexible hose end 204a and the gasket 234 provides substantial resistance to tensile forces, which might otherwise tend to pull the hose connection system 202 off of the flexible hose 204.

An optional backer ring 236 can be provided over the hose 204 and abutting the inner fitting shoulder 24 and the gasket first end 234a. The presence or absence of the backer ring 236, and its size, can be used to control the position of the inner fitting 6a with respect to the outer fitting 6b.

VII. Third Modified Embodiment Hose Coupling System 302

Figure 9:
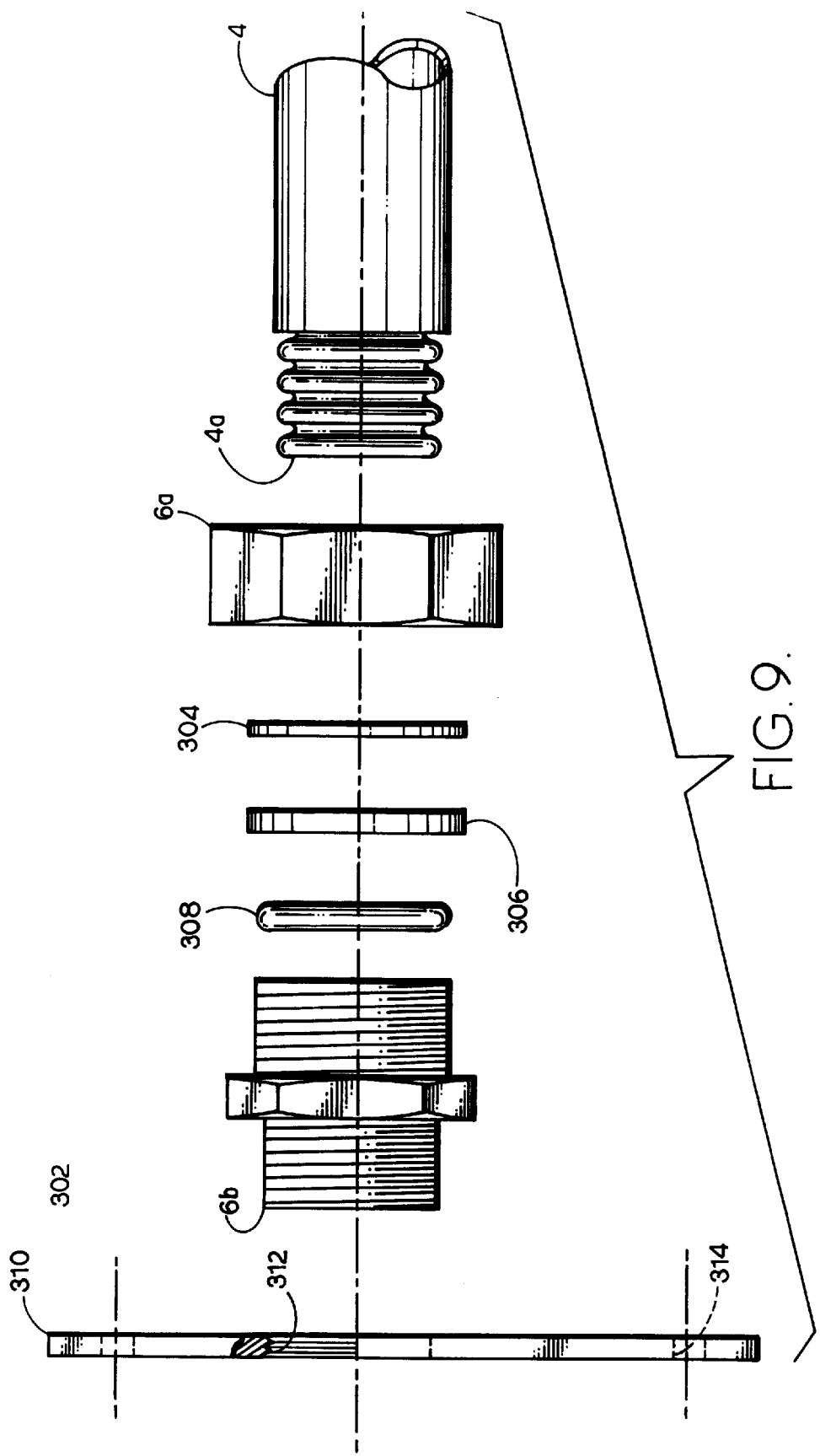
FIG. 9 is an exploded, side elevational view of a corrugated hose coupling system comprising a third modified embodiment of the present invention.
Figure 10:
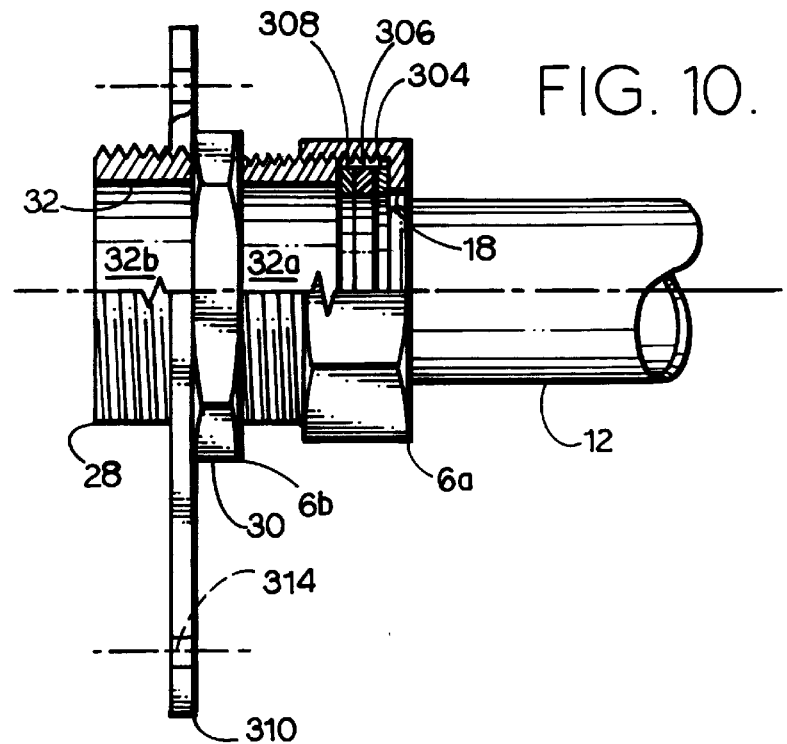
FIG. 10 is a side elevational view of the third modified embodiment hose coupling system, shown assembled.
Figure 11:
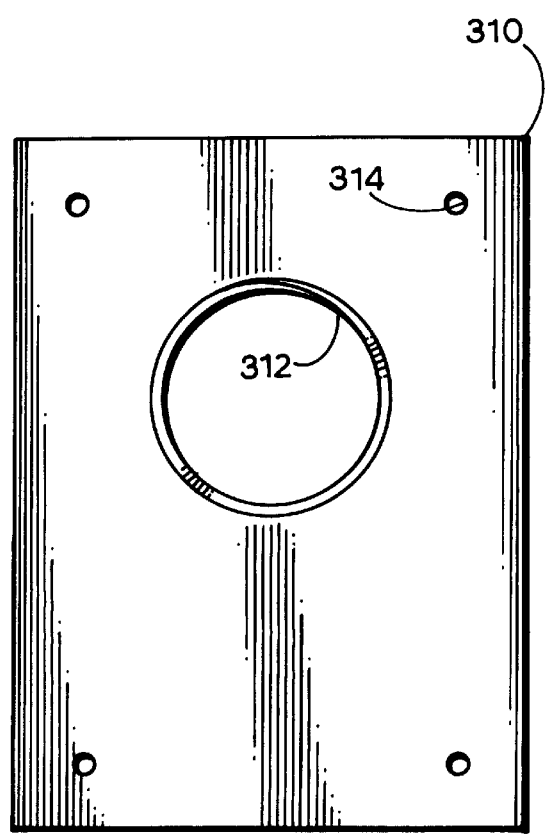
FIG. 11 is an enlarged, transverse, cross-sectional view of the third modified embodiment corrugated hose coupling system, particularly showing a termination plate thereof and taken generally along line 11—11 in FIG. 10.

A hose coupling system comprising a third modified embodiment of the present invention is shown in FIGS. 9–11 and is generally designated by the reference numeral 302. The hose coupling system 302 includes a retainer ring 304 which can comprise, for example, an expandable washer such as the previously-described expandable washer 38, which can be fabricated from a suitable material such as, for example, stainless steel. The stainless steel retainer ring 304 engages the flexible hose 4 and is retained within a corrugation groove 10b by an inner fitting 6a.

A slider ring 306 is slidably positioned over the corrugated flexible hose 4 and engages the retainer 304. A slider ring 306 can comprise, for example, plastic, metal, high-temperature ceramic or some other suitable material A silicon gasket 308 with the general configuration of an O-ring is located outboard the slider ring 306 and engages the inner end 26 of the male-threaded outer fitting 6b. Tightening the inner fitting (nut) 6a on the outer fitting 6b compresses the silicon gasket O-ring 308 against the outer fitting inner end 26 to form a sealing connection therebetween.

The third modified hose coupling system 302 includes a termination plate 310 which includes a threaded, female central receiver 312 and a plurality of corner receivers 314. The termination plate 310 is adapted for mounting on a wall by means of mechanical fasteners, such as screws or the like (not shown), extending through the corner receivers 314 and into the wall structure (not shown). The outer fitting outer end 28 is threadably received in the termination plate central receiver 312 and extends into the wall cavity for connection to a component of a gas fuel system, such as a fuel line or the like.

VIII. Fourth Modified Embodiment Hose Coupling System 402

Figure 12:
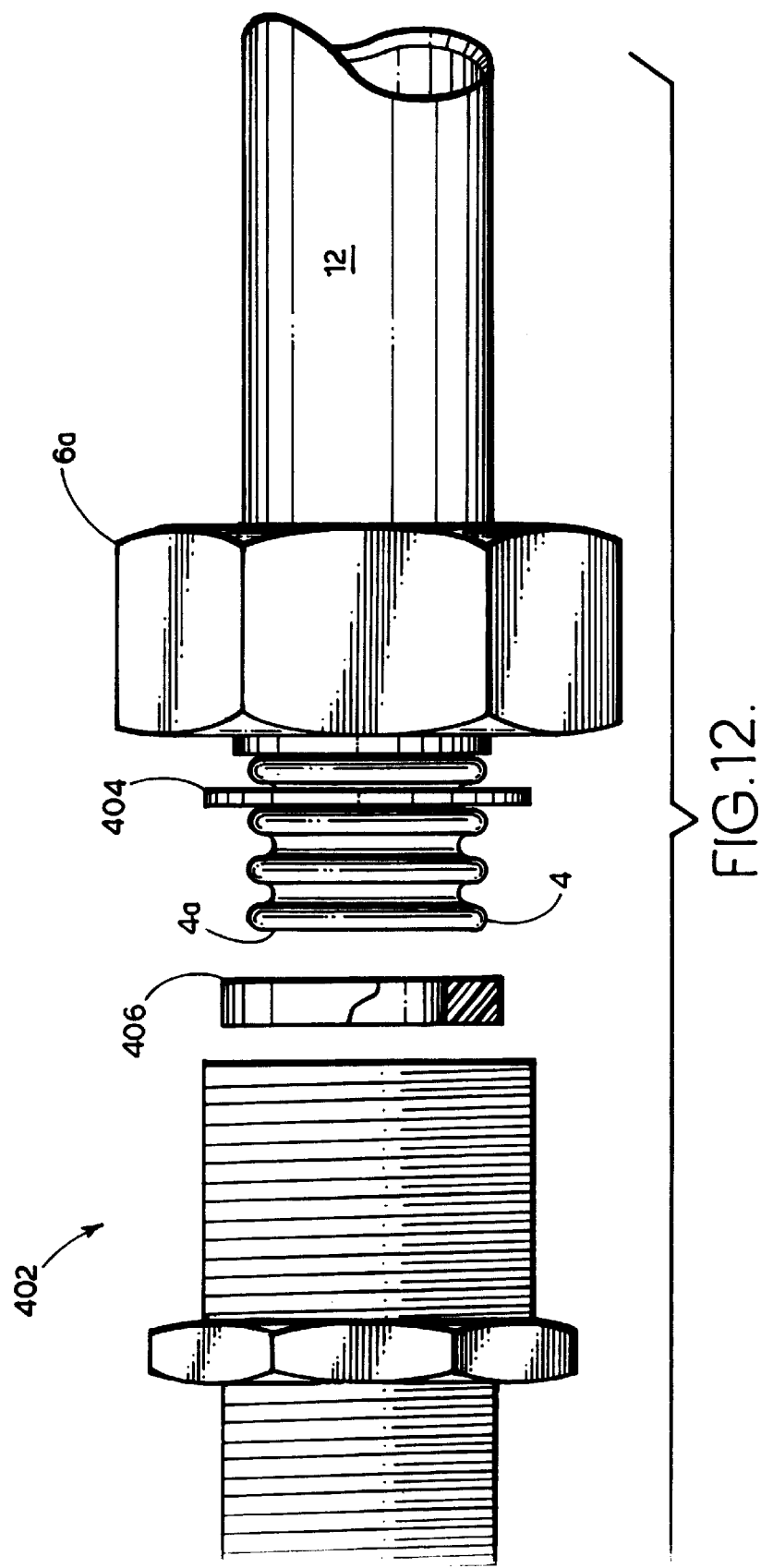
FIG. 12 is an exploded, side elevational view of a corrugated hose coupling system comprising a fourth modified embodiment of the present invention.
Figure 13:
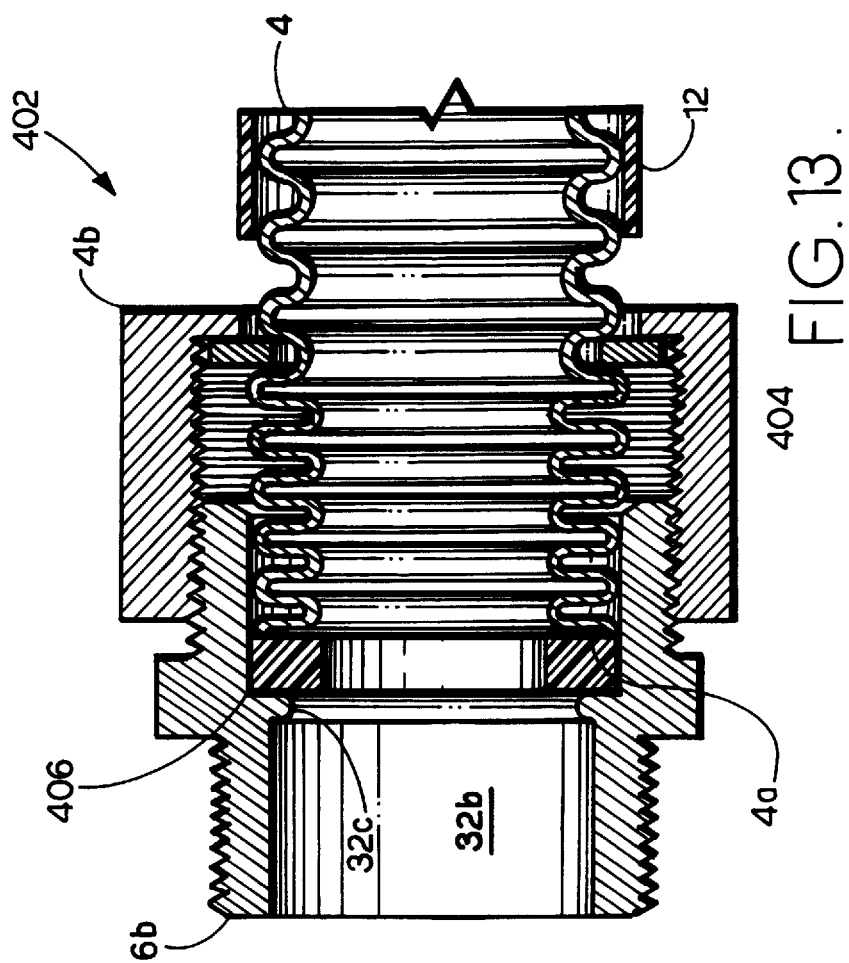
FIG. 13 is an enlarged, longitudinal, cross-sectional view of the fourth modified embodiment corrugated hose coupling system.

A corrugated flexible hose coupling system comprising a fourth modified embodiment of the present invention is shown in FIGS. 12–13 and is generally designated by the reference numeral 402.

The fourth modified embodiment hose coupling system 402 includes a retainer ring or expandable washer 404 which can be similar, for example, to the expandable washer 38 described above which receives the corrugated flexible hose 4 and is retained on a groove 10b thereof by the inner fitting 6a. A high temperature sealing ring 406 is received within the outer fitting bore inner section 32a and engages the outer fitting shoulder 32c. As shown in FIG. 13, the corrugated flexible hose 4 can be compressed between its end 4a, which engages the sealing ring 406, and the retainer ring 404. Compression of the flexible hose corrugations 10 can facilitate a tight seal of the sealing ring 406. The amount of compression of the flexible hose corrugations 410 can be controlled by the extent to which the outer fitting inner end 26 is threadably received in the inner fitting threaded bore 22. The corrugated flexible hose coupling system 402 provides significant performance advantages since the corrugated flexible hose 4 extends into the outer fitting bore inner sectio n 32a and since the inner fitting 6a can be used to compress the corrugated flexible hose 4 for tightening the sealing engagement on the sealing ring 406.

IX. Fifth Modified Embodiment Flexible Hose Coupling System 502

Figure 14:
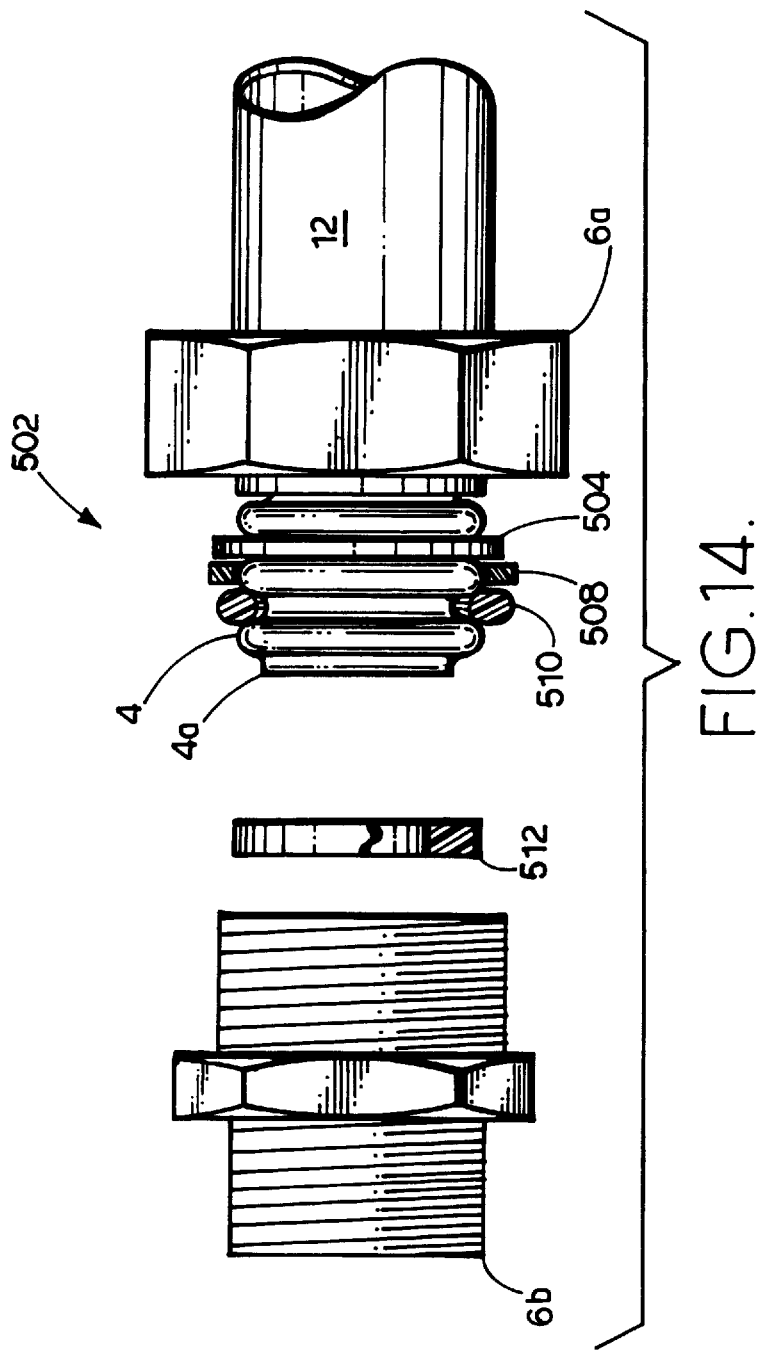
FIG. 14 is an exploded, side elevational view of a corrugated hose coupling system comprising a fifth modified embodiment of the present invention.
Figure 15:
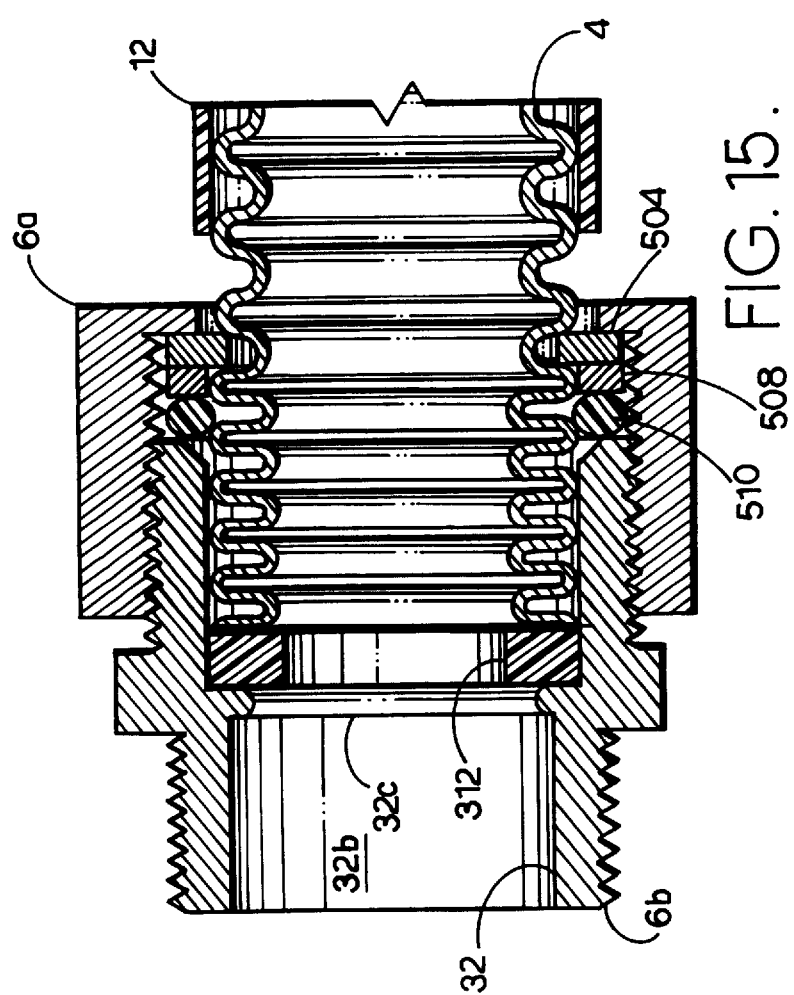
FIG. 15 is an enlarged, longitudinal, cross-sectional view of the fifth modified embodiment corrugated hose coupling system.

A hose coupling system comprising a fifth modified embodiment of the present invention is shown in FIGS. 14–15 and is generally designated by the reference numeral 502. The hose coupling system 502 is designed to couple a corrugated, flexible hose 4 to a fitting assembly 6 comprising an inner fitting 6a and an outer fitting 6b.

A retainer ring or expandable washer 504 is received on the flexible corrugated hose 4 and retained in a groove 10b thereof. The retainer ring or expandable washer 504 can comprise, for example, an expandable washer or C-clip such as that described above and designated by the reference numeral 38.

A backer ring 508 comprising stainless steel or some other suitable material slidably receives the flexible hose 4 and is positioned outboard the retainer ring 504 in engagement with same. A silicon gasket O-ring 510 is positioned in the hose groove 10b next outboard from the hose groove 10b receiving the retainer ring 504. A compression gasket or high-temperature sealing ring 512 is positioned in the throat or bore inner section 32a of the outer fitting 6b. The compression gasket 512 can comprise a suitable material such as plastic, metal, high-temperature ceramic, etc., which material can be chosen to perform within the temperature and pressure ranges of particular applications of the fifth modified hose coupling system 502. In operation, the fifth modified hose coupling system 502 can be assembled by inserting the compression gasket 512 against the outer fitting bore shoulder 32c within the outer fitting bore throat 32a. The flexible hose end 4a, with the retainer ring 504, the backer ring 508 and the O-ring 510 mounted thereon (FIG. 14) is then inserted into the outer fitting bore throat 32a until the flexible hose end 4a engages the compression gasket 512 and the O-ring 510 engages the outer fitting inner end 26. The retainer ring 504, the backer ring 508, and the O-ring 510 collectively form inner gasket means 506a and form a seal between the flexible hose 4 and the outer fitting inner end 26. The engagement of the compression gasket 12 with the shoulder 32c and the hose end 4a form outer gasket means 506b. Thus, the hose coupling system 402 forms independent seals comprising inner and outer gasket means 506a,b. The tightness of the inner and outer gasket means 506a,b can be adjusted by threadably adjusting the inner fitting 6a on the outer fitting 6b, thus effecting a clamping action with respect to the inner and outer gasket means 6a, 6b. Moreover, the hose corrugations 10 can compress somewhat as the hose end 4a engages the compression gasket 512 for biasing same tightly into engagement with the shoulder 32c.

The threaded interconnection of the inner and outer fittings 6a, 6b facilitate servicing the hose coupling systems of the present invention, whereby their respective gaskets and other components can be replaced. Moreover, pipe joint compounds, caulks and other viscous or semi-viscous materials could be used in connection with the hose coupling systems of the present invention to enhance the sealing, coupling and corrosion-resistant characteristics thereof.

X. Hose Coupling System Application 602

Figure 16:
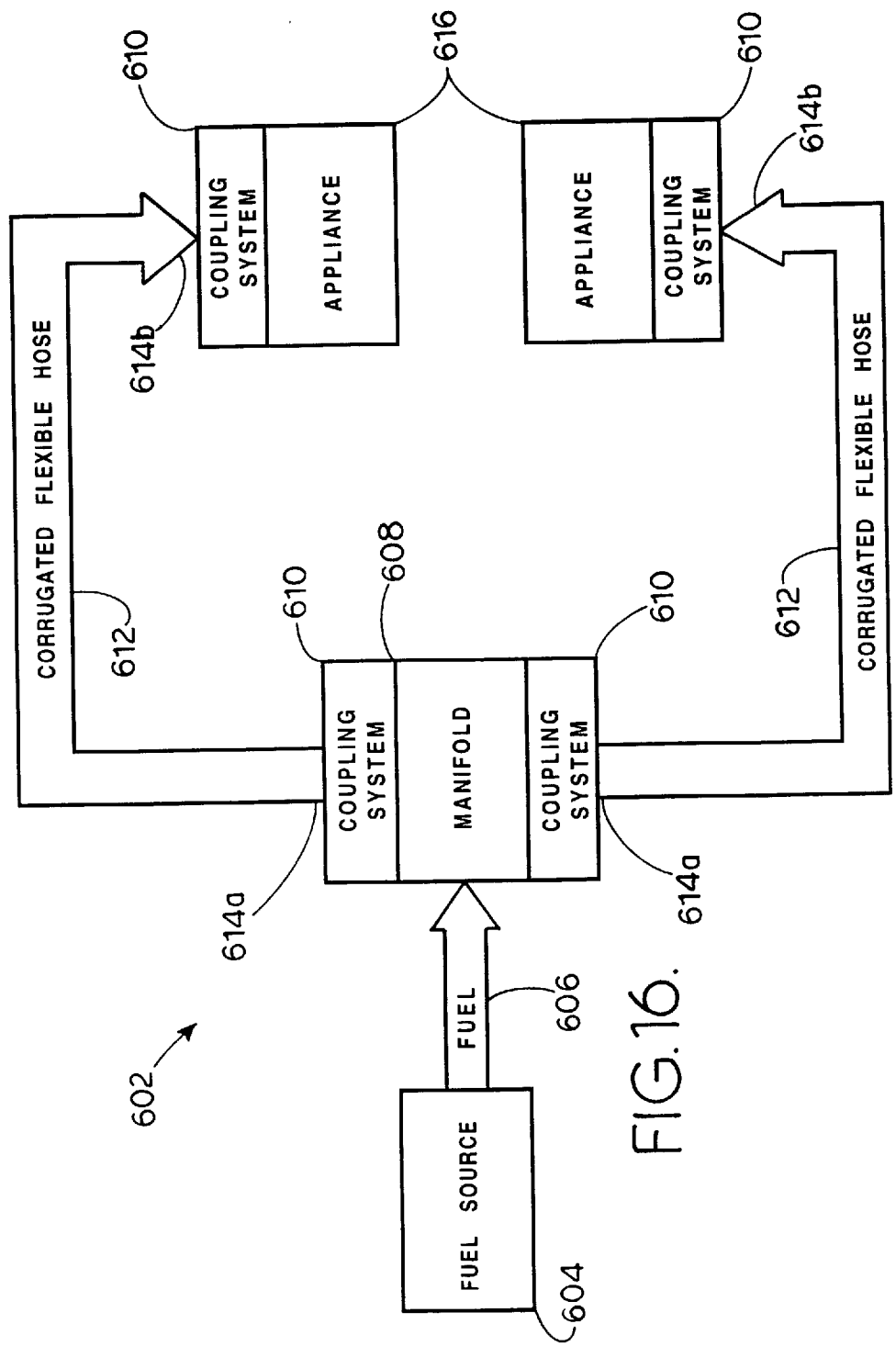
FIG. 16 is a schematic diagram of an application of the corrugated hose coupling system of the present invention.

Without limitation on the generality of useful applications of the hose coupling systems of the present invention, an exemplary application comprising an environment is shown in FIG. 16 and is generally designated by the reference numeral 602. The application 602 includes a fuel source 604, such as a tank, supply line or other source of fuel such as propane, natural gas, etc. The fuel source 4 is connected by a fuel line 606 to a manifold 608 which can mount a plurality (e.g., two are shown) of hose coupling systems 210 embodying the present invention. The hose coupling systems 610 fluidically connect the manifold 608 to corrugated flexible hose sections 612 at their first ends 614a. Second ends 614b of the flexible hose section 612 are connected to appliances 616 by additional hose coupling systems 610. Without limitation of generality of useful applications of the hose coupling systems 610, they can be used for connecting virtually any appliance or device which consumes gaseous fuel, such as, for example, furnaces, hot water heaters, ovens, stoves, heaters, etc. Moreover, the system can be expanded to include various numbers of appliances 216, etc.

XI. Sixth Modified Embodiment Flexible Hose Coupling System 702

Figure 17:
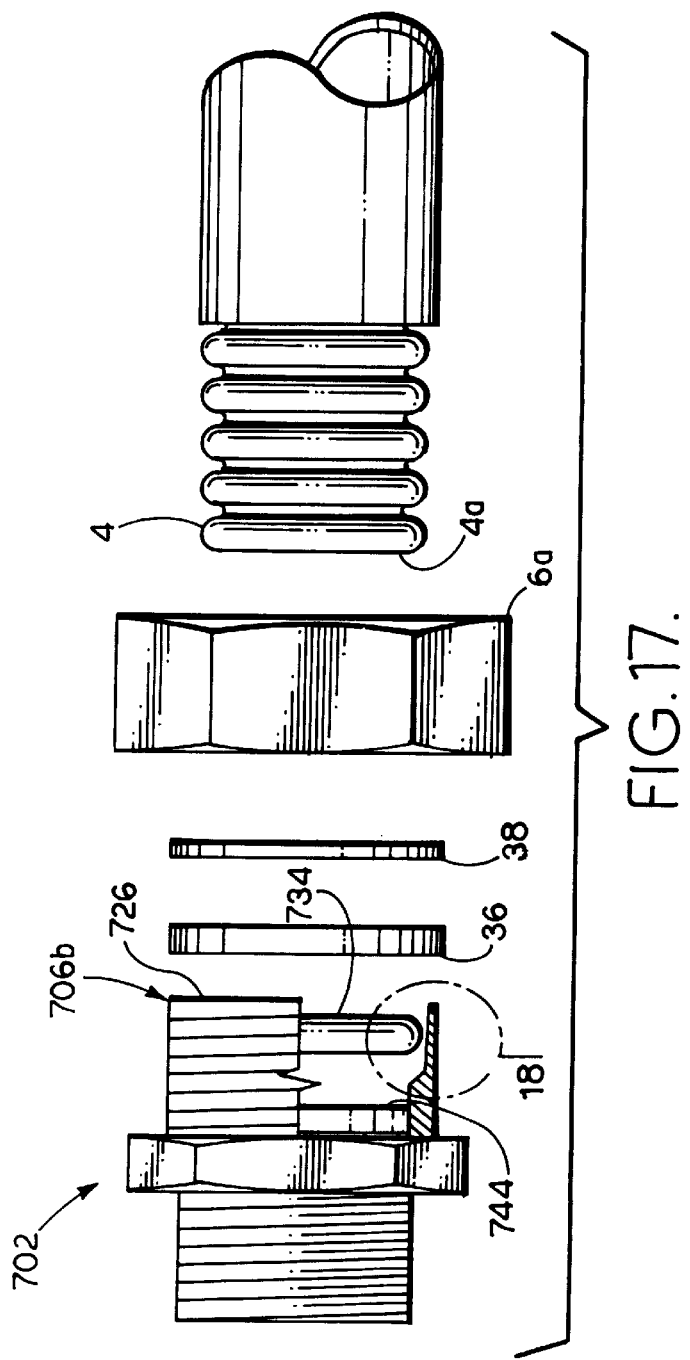
FIG. 17 is an exploded, side elevational view of a flexible hose coupling system comprising a sixth modified embodiment of the present invention.
Figure 18:
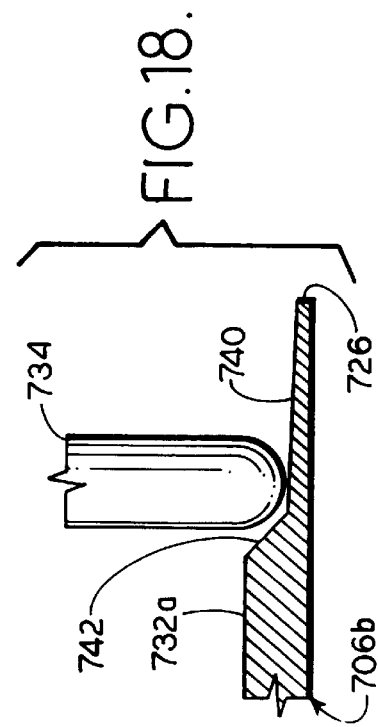
FIG. 18 is an enlarged, cross-sectional view thereof, particularly showing the placement of a O-ring within an outer fitting assembly bore thereof.

FIGS. 17 and 18 show a hose coupling system 702 comprising a sixth modified embodiment of the present invention incorporating an O-ring 734 in an outer fitting 706b. The outer fitting 706b includes an inner end 726 with a bore inner section 732a. Adjacent to the outer fitting inner end 726, the bore inner section 732a includes a counterbore 740 which terminates at an annular counterbore rim 742.

In operation, the flexible hose end 4a is retained within the inner fitting 6a by the expandable washer 38. The O-ring 734 forms a seal between the hose inner end 4a and the counterbore 740. The backer ring 36 is engaged by the expandable washer 38 as described in connection with the primary embodiment. A seal ring 744 is received in the bore inner section 32a at a location positioned outwardly from the counterbore 740 and engages the shoulder 24. As with the previously described embodiments, tightening the inner fitting 6a onto the outer fitting 6b compresses corrugations of the hose 4 against the sealing ring 744, with the O-ring 734 captured between a pair of adjacent corrugations and the counterbore 740.

In operation, securely capturing the O-ring 734 within the counterbore 740 can provide an effective fluid seal in cooperation with the seal ring 744 whereby even if one of the seals is damaged, the other would provide backup sealing capabilities. The O-ring 734 and the seal ring 744 can be designed so that either would provide an effective seal for the hose coupling system 702. The backer ring 36, the expandable washer 38 and the inner fitting 6a function generally in a manner consistent with the descriptions of the previous embodiments.

XII. Seventh Modified Embodiment Hose Coupling System 802

Figure 19:
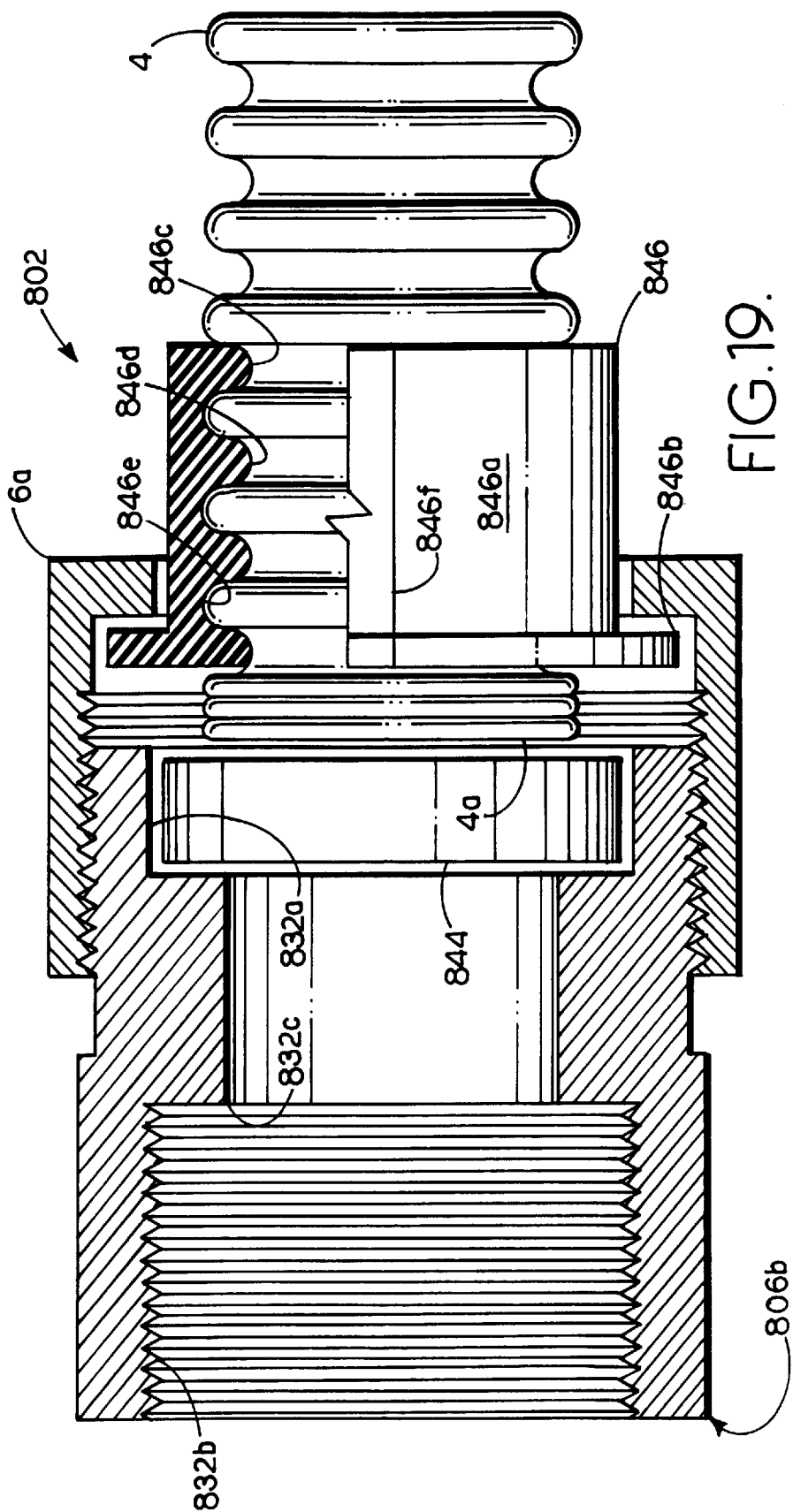
FIG. 19 is a longitudinal cross-sectional view of a corrugated flexible hose coupling system comprising a seventh modified embodiment of the present invention.

FIG. 19 shows a hose coupling system 802 comprising a seventh modified embodiment of the present invention. The hose coupling system 802 includes an outer fitting 806b which includes a bore inner section 832a, a bore outer section 832b and a shoulder 832c separating the inner and outer sections 832a,b. In the hose coupling system 802 shown, the bore outer section 832b has internal, female threading whereby the outer fitting 806b comprises a male-female fitting. However, the outer fitting 806b could also comprise a male-male fitting, as is the case with previously described embodiments.

A seal ring 844 is located in the bore inner section 832a in engagement with the shoulder 832c. A split sleeve 846 includes a body 846a and an annular end flange 846b. A bore 846c extends longitudinally through the sleeve 846 and includes lands and grooves 846d,e forming an annular corrugated configuration corresponding to the annular corrugations of the flexible hose 4. The split sleeve 846 includes a longitudinally-extending slit 846f which permits the sleeve 846 to be opened to receive the flexible hose 4.

The hose coupling system 802 is assembled by inserting the flexible hose end 4a through the inner fitting assembly 6a. The split sleeve 846 is then placed over the flexible hose 4. The split sleeve body 8a is extended through the inner fitting receiver 18 until the split sleeve flange 846b engages the inner fitting shoulder 24. Threadably mounting the inner fitting 6a on the outer fitting 6b advances the hose end 4a into engagement with the seal ring 844 whereby the end hose corrugations are compressed as shown, the hose end 4a tightly engages the seal ring 844 and the split sleeve flange 846b is compressed against the inner fitting shoulder 24. The hose coupling system 802 thus forms a double seal with the flexible hose 4 by means of the seal ring 844 and the split sleeve 846.

XIII. Eighth Modified Embodiment Hose Coupling System 902

Figure 20:
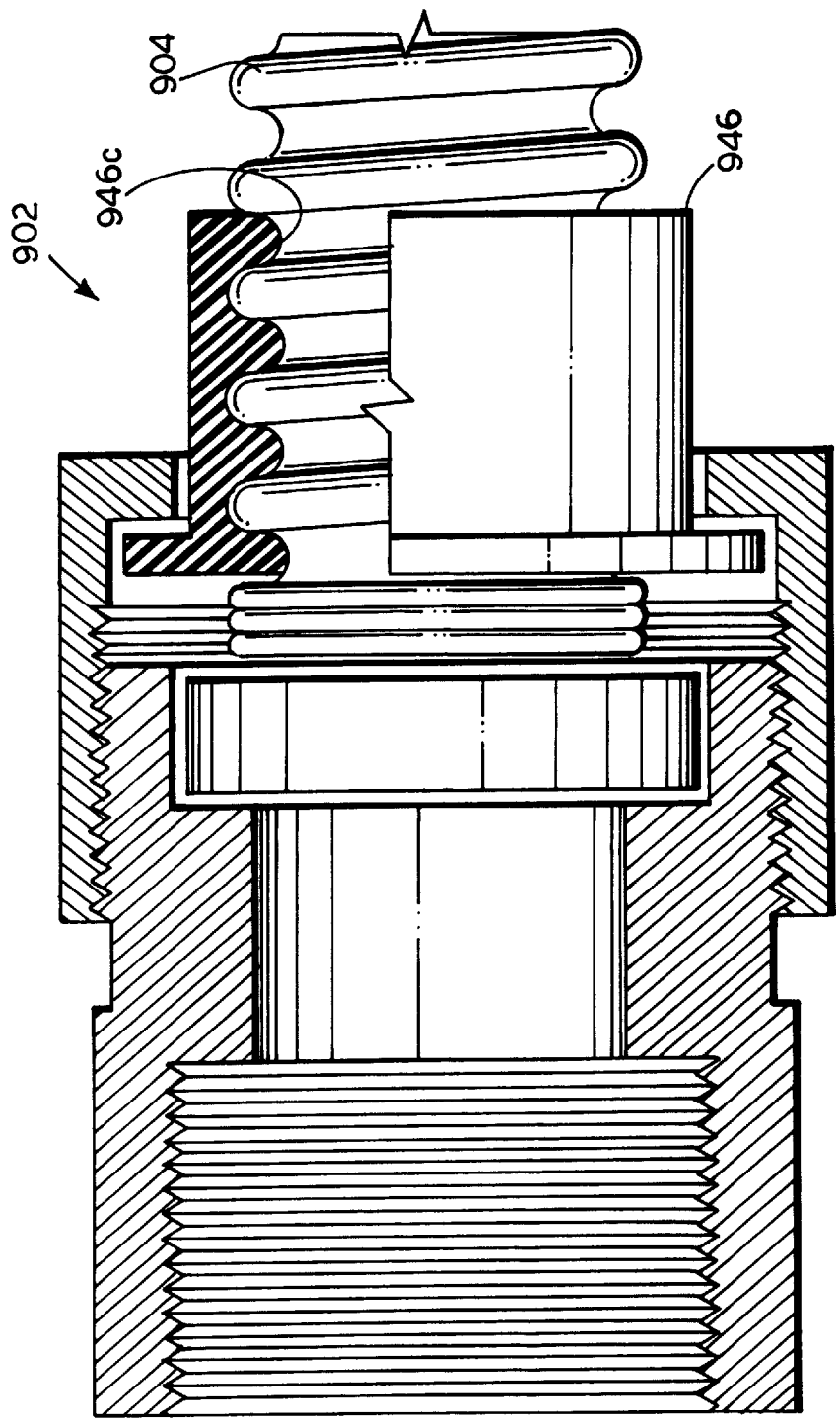
FIG. 20 is a longitudinal, cross-sectional view of a corrugated flexible hose coupling system comprising a seventh modified embodiment of the present invention.

FIG. 20 shows a hose coupling system 902 comprising an eighth modified embodiment of the present invention and including a split sleeve 946 with a female-threaded bore 946c. The female-threaded bore 946c is adapted to threadably receive a spiral-wound flexible hose 904, which otherwise has a similar configuration to the split sleeve 846 described above and operates in a manner similar thereto.

It is to be understood that while certain forms of the present invention have been illustrated and described herein, it is not to be limited to the specific forms or arrangement of parts described and shown.

What is claimed and desired to be secured by Letters Patent is as follows:

1. A coupling system for a flexible hose with corrugations and an end, which comprises:
   (a) a fitting assembly including:
      (1) an inner fitting with inner and outer ends, a receiver receiving the flexible hose in its inner end and a female-threaded bore open at its outer end;
      (2) an outer fitting with a male-threaded inner end threadably receivable in said inner fitting female-threaded bore, an outer end, a bore extending between said outer fitting ends and having a bore inner section adjacent said outer fitting inner end and a bore outer section adjacent said outer fitting outer end; and
      (3) said outer fitting bore having a shoulder between its inner and outer sections;
   (b) an expandable washer having an expanded, first position passing the hose therethrough and a constricted, second position clamping said hose between corrugations thereof, said washer being positioned within said fitting assembly in its constricted second position;
   (c) a backer ring slidably receiving the hose and positioned within the fitting assembly in engagement with the expandable washer;
   (d) a sealing ring comprising an O-ring engaging the backer ring, the hose and the outer fitting, said O-ring including sealing means for forming a seal between the hose and the fitting assembly;
   (e) said expandable washer, said backer ring and said sealing ring collectively comprising inner gasket means engaging said outer fitting inner end; and
   (f) outer gasket means comprising a compression gasket positioned within said outer fitting bore and engaging the flexible hose end.

2. A corrugated flexible hose coupling system application, which includes:
   (a) a fuel source;
   (b) a fuel line connected to the fuel source;
   (c) a manifold connected to the fuel line;
   (d) a coupling system connected to the manifold and including:
      (1) a fitting assembly including an inner fitting for receiving a flexible hose and an outer fitting selectively connectable with the inner fitting; and
      (2) a washer assembly including:
         (i) a retainer for engaging the hose and retaining same in said inner fitting; and
         (ii) sealing ring means for engaging the hose and said outer fitting for forming a fluid seal therebetween;
   (e) a flexible hose with corrugations and a first end connected to the said coupling system by said fitting assembly and a second end;
   (f) a second coupling system connected to the flexible hose second end;
   (g) an appliance connected to the flexible hose second end through said second coupling system;
   (h) said outer fitting having a male-threaded outer end; and
   (i) a termination plate including a female-threaded central bore threadably receiving said outer fitting outer end.

3. A coupling system for a flexible hose with corrugations, which comprises:
   (a) a fitting assembly including an inner fitting receiving the flexible hose and an outer fitting selectively connectable with the inner fitting; and
   (b) a washer assembly including:
      (1) a retainer engaging said hose and retaining same in said inner fitting; and
      (2) sealing ring means for engaging said hose and said outer fitting for forming a fluid seal therebetween;
   (c) said retainer and said sealing ring means comprising a gasket with an outer surface and a bore having alternating lands and grooves engageable with the corrugations of said flexible hose;

(d) a backer ring receivable in said inner fitting and engageable with said inner fitting and said gasket;

(e) said gasket having a frusto-conical configuration with first and second ends and a tapered outer surface; and (f) said retainer retaining said hose in said inner fitting by the engagement of said gasket bore lands and grooves with the corrugations of said flexible hose and by the engagement of said backer ring with said gasket and said inner fitting, said sealing ring means of said gasket being retained in sealing engagement with said outer fitting by the selective engagement of said inner and outer fittings.

4. A coupling system for a flexible hose with corrugations and an end, which comprises:

(a) a fitting assembly including:
(1) an inner fitting with inner and outer ends, a receiver receiving the flexible hose in its inner end and a female-threaded bore open at its outer end; and
(2) an outer fitting with a male-threaded inner end threadably receivable in said inner fitting female-threaded bore, an outer end, a bore extending between said outer fitting ends and having a bore inner section adjacent said outer fitting inner end and a bore outer section adjacent said outer fitting outer end;

(b) an O-ring receiving said flexible hose and positioned within said outer fitting bore inner section;

(c) a seal ring positioned in said outer fitting bore inner section and engaging said flexible hose end;

(d) an expandable washer having an expanded, first position passing the hose therethrough and a constricted, second position clamping said hose between corrugations thereof, said washer being positioned within said fitting assembly in its constricted second position;

(e) a backer ring slidably receiving the hose and positioned within the fitting assembly in engagement with the expandable washer;

(f) said outer fitting bore inner section having a counterbore receiving said O-ring; and (g) said flexible hose end being retained in said outer fitting bore inner section and said backer ring being retained in engagement with said expandable washer and said outer fitting inner end by an engagement between said inner fitting and said expandable washer within said inner fitting bore and a threaded interconnection between said inner fitting female-threaded bore and said outer fitting male-threaded inner end.

5. A coupling system for a flexible hose with annular corrugations and an end, which comprises:

(a) a fitting assembly including:
(1) an inner fitting with inner and outer ends, a receiver receiving the flexible hose in its inner end and a female-threaded bore open at its outer end; and
(2) an outer fitting with a male-threaded inner end threadably receivable in said inner fitting female-threaded bore, an outer end, a bore extending between said outer fitting ends and having a bore inner section adjacent said outer fitting inner end and a bore outer section adjacent said outer fitting outer end;

(b) a sleeve including a sleeve body, a sleeve bore extending through said sleeve body and receiving the flexible hose and an annular flange;

(c) said sleeve body extending through said inner fitting receiver and said sleeve flange engaging said inner fitting;

(d) said sleeve bore having a corrugated configuration with lands and grooves corresponding to the configuration of the corrugated flexible hose;

(e) said sleeve further including a longitudinally-extending slit adapted to expand for receiving the flexible hose;

(f) said outer fitting bore including a shoulder between the inner and outer sections thereof;

(g) a seal ring positioned in said outer fitting bore inner section in sealing engagement with said shoulder and said flexible hose end; and (h) said hose end being retained against said seal ring by a threaded engagement of said inner fitting female-threaded bore and said outer fitting male-threaded inner end, and said sleeve being retained on said flexible hose by said inner fitting receiver receiving said sleeve body and by said sleeve flange engaging said inner fitting, and said sleeve being retained on said flexible hose by said sleeve bore lands and grooves receiving respective flexible hose corrugations.

6. A coupling system for a spiral-wound flexible hose, which comprises:

(a) a fitting assembly including:
(1) an inner fitting with inner and outer ends, a receiver receiving the flexible hose in its inner end and a female-threaded bore open at its outer end; and
(2) an outer fitting with a male-threaded inner end threadably receivable in said inner fitting female-threaded bore, an outer end, a bore extending between said outer fitting ends and having a bore inner section adjacent said outer fitting inner end and a bore outer section adjacent said outer fitting outer end;

(b) a sleeve including a sleeve body, a sleeve bore extending through said sleeve body and receiving the flexible hose and an annular flange;

(c) said sleeve body extending through said inner fitting receiver and said sleeve flange engaging said inner fitting;

(d) said sleeve bore having a female-threaded configuration corresponding to the configuration of said spiral-wound flexible hose;

(e) said sleeve further including a longitudinally-extending slit adapted to expand for receiving the flexible hose;

(f) said outer fitting bore including a shoulder between the inner and outer sections thereof;

(g) a seal ring positioned in said outer fitting bore inner section in sealing engagement with said shoulder and said flexible hose end; and (h) said hose end being retained against said seal ring by a threaded engagement of said inner fitting female-threaded bore and said outer fitting male-threaded inner end, and said sleeve being retained on said flexible hose by said inner fitting receiver receiving said sleeve body and by said sleeve flange engaging said inner fitting, and said sleeve being retained on said flexible hose by said sleeve bore female threads receiving said flexible hose spiral windings.

\* \* \* \* \*